United States Patent
Böhringer et al.

(10) Patent No.: US 6,706,413 B2
(45) Date of Patent: Mar. 16, 2004

(54) NON-POROUS, BREATHABLE MEMBRANE CONTAINING POLYAMIDE-4,6

(75) Inventors: Bertram R. Böhringer, Wuppertal (DE); Henricus Joannes Maria Van De Ven, Arnhem (DE); Jozef Christiaan Wilhelmus Spijkers, Haan (DE)

(73) Assignee: Sympatex Technologies GmbH, Wuppertal (DE)

( * ) Notice: Subject to any disclaimer, the term of this patent is extended or adjusted under 35 U.S.C. 154(b) by 24 days.

(21) Appl. No.: 10/114,111

(22) Filed: Apr. 3, 2002

(65) Prior Publication Data
US 2002/0155307 A1 Oct. 24, 2002

(30) Foreign Application Priority Data
Apr. 3, 2001 (EP) .............................. 01108344

(51) Int. Cl.$^7$ .............................. B32B 27/00; D03D 3/00
(52) U.S. Cl. .................... 428/474.4; 428/220; 428/221; 428/332; 428/339; 428/411.1; 428/423.5; 428/474.7; 264/165; 264/172.19; 264/173.1; 264/173.14; 264/173.15; 264/176.1; 264/211.21; 442/50; 442/51; 442/181; 442/327; 442/394
(58) Field of Search ............................ 428/474.4, 220, 428/221, 332, 339, 411.1, 423.5, 474.7, 474.5; 264/165, 172.19, 173.1, 173.14, 176.1, 211.21; 442/50.51, 181, 327, 394

(56) References Cited
U.S. PATENT DOCUMENTS

| | | | | |
|---|---|---|---|---|
| 4,699,973 A | * | 10/1987 | Ito et al. ..................... 528/335 |
| 4,701,377 A | | 10/1987 | Kurita et al. ................ 428/364 |
| 4,808,675 A | * | 2/1989 | Twilley et al. .............. 525/408 |
| 4,833,026 A | * | 5/1989 | Kausch .................... 428/315.5 |
| 4,859,389 A | * | 8/1989 | Kurita et al. ............... 264/130 |
| 4,892,661 A | * | 1/1990 | Huang ........................ 210/640 |
| 5,084,179 A | * | 1/1992 | Knight ................... 210/500.38 |
| 5,157,064 A | * | 10/1992 | Gijsman ..................... 524/114 |
| 5,264,165 A | * | 11/1993 | Knight ........................ 264/41 |
| 5,562,977 A | * | 10/1996 | Jager et al. .................. 442/184 |
| 5,612,105 A | * | 3/1997 | Okamoto et al. .......... 428/34.8 |
| 5,612,124 A | * | 3/1997 | Krummheuer et al. ...... 442/181 |
| 5,741,601 A | * | 4/1998 | Kishida et al. .......... 428/474.4 |
| 5,938,648 A | * | 8/1999 | LaVon et al. ................ 604/358 |
| 6,187,696 B1 | * | 2/2001 | Lim et al. ..................... 442/77 |

FOREIGN PATENT DOCUMENTS

| EP | 0 158 807 A2 | * | 10/1985 |
| EP | 0 254 367 A1 | * | 1/1988 |
| EP | 0 270 647 B1 | * | 4/1990 |
| EP | 0 390 277 A1 | * | 10/1990 |
| EP | 448 647 A | | 10/1991 |
| EP | 0 761 715 A1 | | 3/1997 |
| JP | 63-142059 | * | 6/1988 |
| JP | 02-22858 | * | 9/1990 |
| JP | 63 45 963 A | | 12/1994 |

OTHER PUBLICATIONS

ASTM E–96–66, Standard Methods of Test for Water Vapor Transmission of Materials in Sheet Form (1972).

* cited by examiner

*Primary Examiner*—P. Hampton Hightower
(74) *Attorney, Agent, or Firm*—Oliff & Berridge, PLC

(57) ABSTRACT

The present invention is a non-porous, breathable membrane of at least polyamide-4,6, with an elongation at rupture of about 250 to about 500% in the longitudinal direction and about 200 to about 500% in the transverse direction. The membrane has a higher heat resistance than a non-porous, breathable membrane made from polyether ester and, if it also contains an antioxidant, passes the oven/watertightness test. If the membrane is produced from a mixture of polyamide-4,6 and about 10 to about 30% by weight polyether amide, the membrane exhibits a surprisingly increased water-vapor permeability. The membrane is usable in the manufacture of thermally protective clothing.

24 Claims, No Drawings

NON-POROUS, BREATHABLE MEMBRANE CONTAINING POLYAMIDE-4,6

BACKGROUND OF THE INVENTION

1. Field of Invention

The present invention relates to a membrane that is breathable, i.e., impermeable to water and permeable to water vapor.

2. Description of Related Art

It is well known that the inclusion of breathable membranes increases wearing comfort in clothing.

Breathable membranes made from non-porous polyether ester, polyether amide, or polyurethane are known. However, the heat resistance of these known breathable membranes is insufficient for use in thermally protective clothing.

A sufficiently heat resistant, breathable membrane made from porous polytetrafluoroethylene (PTFE) is known for clothing requiring a high degree of thermal protection, such as that for firefighters. However, the breathability of this PTFE membrane can be impaired due to its porous structure, not only by clogging of the pores which reduces the water-vapor permeability, but also by wetting of the pores with surfactants which eliminates the water impermeability. Furthermore, recyclability is impaired compared to breathable laminates made from polyether ester, polyether amide, or polyurethane.

SUMMARY OF THE INVENTION

The present invention therefore has the object of providing a breathable membrane that is suitable for use in thermally protective clothing and that at least significantly reduces the disadvantages of the known breathable membranes.

This object is satisfied in the present invention by a non-porous, breathable membrane comprising at least polyamide-4,6, with an elongation at rupture of about 250 to about 500% in a longitudinal direction and about 200 to about 500% in a transverse direction.

The membrane of the invention is not only breathable to a great extent, but it also exhibits a higher heat resistance compared to the breathable membranes made from polyether ester, polyether amide, or polyurethane.

DETAILED DESCRIPTION OF PREFERRED EMBODIMENTS

According to the invention, the term polyamide-4,6 includes not only polyamide-4,6, i.e., polytetramethylene adipamide, but also a copolymer comprising at least about 90% polytetramethylene adipamide units and a comonomer such as caprolactam, wherein the comonomer fraction is preferably about 5 to about 6%.

The existence of an antioxidant permits a further increase in the heat resistance of the membrane of the invention so that the membrane containing an antioxidant passes the oven/watertightness test detailed later. For this reason, the membrane of the invention preferably comprises polyamide-4,6 and a commercially available antioxidant such as CIBA GEIGY IRGANOX® 1098 or IRGANOX 1330, or the potassium iodide/copper iodide system.

The membrane of the invention preferably comprises an amount of antioxidant that is from about 0.1 to about 1% by weight, and more preferably from about 0.1 to about 0.5% by weight, with respect to the polyamide-4,6.

In another preferred embodiment, the membrane of the invention comprises a mixture of polyamide-4,6 and a polyether amide, where the latter can be, for example, a polyether amide as disclosed in EP-A 0 761 715.

Preferably, the fraction of the polyether amide with respect to polyamide-4,6 is about 5 to about 30% by weight. Surprisingly, it was discovered that in the cited composition range, the membrane made from a mixture of polyamide-4,6 and polyether amide has a higher water-vapor permeability than would be expected considering the fractions of polyamide-4,6 and polyether amide in the mixture and the water-vapor permeability of pure polyamide-4,6 and pure polyether amide.

An underlying object of the invention is further satisfied by a process for producing a non-porous, breathable membrane, comprising the following steps:

a) providing pellets comprising polyamide-4,6, wherein the pellets are pressed from a powder that comprises at least a polyamide-4,6 powder resulting from the production of polyamide-4,6, b) feeding the pellets to an extruder, c) converting the pellets in the extruder into a melt, d) extruding the melt at a rate of about 10.0 to about 20.0 kg/h through a slit die having a slit thickness of about 0.4 to about 0.8 mm and a slit width of about 600 to about 1000 mm, to form a film on a moving surface moving at a rate of about 5.2 to about 43.1 m/min, e) withdrawing the film from the moving surface at a rate of about 5.3 to about 44.0 m/min, f) passing the film over a cooling roller moving at a rate of about 5.3 to about 44.0 m/min, and g) winding up the resulting membrane at a rate of about 5.5 to about 47.0 m/min, wherein steps c) to g) are conducted such that a wound-up membrane has an elongation at rupture of about 250 to about 500% in a longitudinal direction and about 200 to about 500% in a transverse direction.

The process of the invention results in a membrane that is not only breathable to a great extent, but also exhibits a higher heat resistance compared to the breathable membranes made from polyether ester, polyether amide, or polyurethane.

According to the invention, the polyamide-4,6 powder used in step a) of the process of the invention for producing the pellets is understood to be not only polyamide-4,6 powder, i.e., polytetramethylene adipamide powder, but also a copolymer powder comprising at least about 90% polytetramethylene adipamide units and a comonomer such as caprolactam, where the comonomer fraction is preferably about 5 to about 6%.

If an antioxidant is used in addition to polyamide-4,6 in step a) of the process of the invention for producing pellets, a membrane is produced with a heat resistance that is even higher so that the membrane of the invention comprising an antioxidant passes the oven/watertightness test detailed later. For this reason, in a preferred embodiment of the process of the invention, the pellets in step a) are pressed from a powder that comprises the polyamide-4,6 powder resulting from the production of polyamide-4,6, and an antioxidant, where CIBA GEIGY IRGANOX® 1098 or IRGANOX® 1330, or the potassium iodide/copper iodide system, serves as the antioxidant, for example.

In another preferred embodiment, the pellets in step a) of the process of the invention can first be pressed from the polyamide-4,6, powder resulting from the production of polyamide-4,6 and then coated with an antioxidant.

The fraction of antioxidant used in step a) of the process of the invention is preferably about 0.1 to about 1% by weight, and more preferably about 0.1 to about 0.5% by weight, with respect to the polyamide-4,6.

In a further preferred embodiment of the process of the invention, polyamide-4,6 powder is mixed with a polyether amide in step a) and pressed into pellets. Examples of polyether amides that can be used are disclosed in EP-A 0 761 715, incorporated herein by reference.

In the process of the invention, the fraction of polyether amide is preferably about 5 to about 30% by weight, with respect to the polyamide-4,6.

The pellets provided in step a) of the process of the invention preferably have a cylinder-like shape, and pellets with a length of about 3 to about 7 mm and width of about 2 to about 4 mm are especially preferred.

Surprisingly, it was discovered that when using pellets in the aforementioned composition range of polyamide-4,6 and polyether amide, a breathable membrane is produced with a water-vapor permeability higher than would be expected on the basis of the fractions of polyamide-4,6 and polyether amide in the mixture and the water-vapor permeability of pure polyamide-4,6 and pure polyether amide.

In step b) of the process of the invention, the pellets are fed to an extruder. The extruder is preferably a 3-zone screw extruder.

In step c) of the process of the invention, comprising converting the pellets in the extruder into a melt, a first extruder zone preferably has a temperature of, for example, about 275 to about 285° C., a second extruder zone has a temperature of, for example, about 305 to about 315° C., and a third extruder zone has a temperature of, for example, about 300 to about 310° C.

In step d) of the process of the invention, the melt is extruded through a slit die onto a movable surface in order to form a film, wherein the slit in the die preferably has a thickness of, for example, about 0.5 to about 0.7 mm.

In step d) of the process of the invention, the formed film is poured onto a moving surface, for example, a conveyor belt. In the process of the invention, the moving surface is preferably a heated casting roller, preferably having a temperature of, for example, about 110 to about 140° C.

In step f), the film is passed over a cooling roller, preferably having a temperature of, for example, about 50 to about 70° C.

In step g), the film is wound up.

It is essential for the breathability of the membrane produced according to the invention that steps c) to g) of the process of the invention be conducted such that the wound-up membrane has an elongation at rupture of about 250 to about 500% in a longitudinal direction and about 200 to about 500% in a transverse direction.

An underlying object of the invention is further satisfied by a membrane produced according to one or more of the previously described processes.

Due to its breathability and heat resistance, the membrane of the invention is usable in the manufacture of thermally protective clothing.

In a preferred embodiment, the membrane of the invention is used as a laminate comprising the membrane and a nonwoven composed of a blend of aramide and polyamide-based fibers, such as BASF BASOFIL® fibers.

The elongation at rupture of the membrane of the invention was measured with a membrane width of about 15 mm, a length of the clamped membrane of about 100 mm, and a rate of about 500 mm/min.

The membrane of the invention is characterized with respect to its water-vapor permeability in accordance with ASTM E 96-66, Method B, with the modification $T_{water}=30°$ C., $T_{air}=20°$ C., relative humidity=60%, and air flow=2 m/s.

The heat resistance of the membrane of the invention is measured with the oven/watertightness test in which the membrane is positioned between two pieces of aramide fabric, placed into an oven preheated to about 260° C., and subjected to thermal stress at about 260° C. for about 5 minutes (measured with a stopwatch). The membrane is then removed from the oven, allowed to cool, and subjected to the watertightness test in accordance with DIN 53886. In accordance with DIN 53886, the membrane is clamped in the watertightness tester described in DIN 53886 and water is applied to one side of the membrane, while the water pressure is increased to about 150 mbar at a rate of about 10 mbar/min. The test is considered satisfactory if no drops of water are observed on the side of the membrane to which water was not applied.

The invention will be explained in more detail on the basis of the following examples.

EXAMPLE 1

A powder produced during the manufacture of a copolymer of 94% polytetramethylene adipamide units and 6% caprolactam units is pressed into pellets with a length of 4 to 6 mm and a width of 3 mm. The pellets are coated with 0.35% by weight IRGANOX® 1098 and transferred to a 3-zone screw extruder, the first zone of which has a temperature of 280° C., the second zone of which has a temperature of 310° C., and the third zone of which has a temperature of 305° C. The resulting melt is poured through a slit die at a rate of 16.1 kg/h having a slit width of 800 mm and thickness of 0.6 mm, onto a casting roller moving at a rate of 18.3 m/min and with a temperature of 130° C., withdrawn from the casting roller at a rate of 18.7 m/min, passed over a cooling roller with a temperature of 60° C. and moving at a rate of 18.7 m/min, and wound up at a rate of 20.0 m/min.

The produced film of Example 1 has a thickness of about 15 $\mu$m, an elongation at rupture of 445% in the longitudinal direction and 420% in the transverse direction, a water-vapor permeability of 1800 g/(m$^2$·24 h), and passes the oven/watertightness test.

EXAMPLE 2

A powder produced during the manufacture of a copolymer of 94% polytetramethylene adipamide units and 6% caprolactam units is mixed with 10% by weight polyether amide granules, with respect to the copolymer of polytetramethylene adipamide and caprolactam, and pressed into pellets with a length of 3 mm and width of 2 mm. The pellets are coated with 0.35% by weight IRGANOX® 1098 and transferred to a 3-zone screw extruder, the first zone of which has a temperature of 280° C., the second zone of which has a temperature of 310° C., and the third zone of which has a temperature of 305° C. The resulting melt is poured through a slit die at a rate of 16.1 kg/h having a slit width of 800 mm and thickness of 0.6 mm, onto a casting roller moving at a rate of 18.3 m/min and with a temperature of 130° C., withdrawn from the casting roller at a rate of 18.7 m/min, passed over a cooling roller with a temperature of 60° C. and moving at a rate of 18.7 m/min, and wound up at a rate of 20.0 m/min.

The produced membrane of Example 2 has a thickness of about 15 $\mu$m, an elongation at rupture of 470% in the longitudinal direction and 350% in the transverse direction, and passes the oven/watertightness test.

Since the water-vapor permeability of an 15 $\mu$m thick membrane consisting of a copolymer of 94% polytetramethylene adipamide units and 6% caprolactam units (A) is 1800 g/(m$^2$·24 h), and the water-vapor permeability of an 15 $\mu$m thick membrane of polyether amide (B) is 2800 g/(m$^2$·24 h), one would expect that the water-vapor permeability of a membrane consisting of 90% by weight (A) and 10% by weight (B) would be calculated as 0.9·1800+0.1·2800=1900 g/(m²·24 h).

Surprisingly, however, the membrane of the invention exhibited a water-vapor permeability of 2250 g/(m²·24 h), i.e., a value 18.4% greater than expected.

EXAMPLE 3

A powder produced during the manufacture of a copolymer of 94% polytetramethylene adipamide units and 6% caprolactam units is mixed with 30% by weight polyether amide granules, with respect to the copolymer of polytetramethylene adipamide and caprolactam, and pressed into pellets with a length of about 3 mm and width of about 2 mm. The pellets are coated with 0.35% by weight IRGANOX® 1098 and transferred to a 3zone screw extruder, the first zone of which has a temperature of 280° C., the second zone of which has a temperature of 310° C., and the third zone of which has a temperature of 305° C. The resulting melt is poured through a slit die at a rate of 16.1 kg/h having a slit width of 800 mm and thickness of 0.6 mm, onto a casting roller moving at a rate of 18.3 m/min and with a temperature of 130° C., withdrawn from the casting roller at a rate of about 18.7 m/min, passed over a cooling roller with a temperature of 60° C. and moving at a rate of 18.7 m/min, and wound up at a rate of 20.0 m/min.

The produced membrane of Example 3 has a thickness of about 15 μm, an elongation at rupture of 350% in the longitudinal direction and 250% in the transverse direction, and passes the oven/watertightness test.

Since the water-vapor permeability of an about 15 μm thick membrane of a copolymer of 94% polytetramethylene adipamide units and 6% caprolactam units (A) is 1800 g/(m²·24 h), and the water-vapor permeability of a 15 μm thick membrane of polyether amide (B) is 2800 g/(m²·24 h), one would expect that the water-vapor permeability of a membrane of 70% by weight (A) and 30% by weight (B) would be calculated as 0.7·1800+0.3·2800=2100 g/(m²·24 h).

Surprisingly, however, the membrane of the invention exhibited a water-vapor permeability of 2340 g/(m²·24h), i.e., a value 11.4% greater than expected.

What is claimed is:

1. A non-porous, breathable membrane comprising at least polyamide-4,6, having an elongation at rupture of about 250 to about 500% in a longitudinal direction and about 200 to about 500% in a transverse direction.

2. The membrane according to claim 1, wherein the membrane further comprises an antioxidant.

3. The membrane according to claim 2, wherein an amount of the antioxidant in the membrane is about 0.1 to about 1% by weight with respect to the polyamide-4,6.

4. The membrane according to claim 3, wherein an amount of the antioxidant in the membrane is about 0.1 to about 0.5% by weight with respect to the polyamide-4,6.

5. The membrane according to claim 1, wherein the membrane comprises a mixture of polyamide-4,6 and a polyether amide.

6. The membrane according to claim 5, wherein an amount of the polyether amide is about 5 to about 30% by weight with respect to the polyamide-4,6.

7. A process for producing a non-porous, breathable membrane, corn-p rising the steps of:
 a) providing pellets comprising polyamide-4,6, wherein the pellets are pressed from a powder tat comprises at lent polyamide-4,6 powder resulting from a production of polyamide-4,6,
 b) feeding the pellets to an extruder,
 c) converting the pellets in the extruder into a melt,
 d) extruding the melt at a rate of about 10.0 to about 20.0 kg/b, through a slit die having a slit thickness of about 0.4 to about 0.8 mm and a slit width of about 600 to about 1000 mm, to toxin a film on a moving surface moving at a rate of about 5.2 to about 43.1 m/min,
 e) withdrawing the film from the moving surface at a rate of about 5.3 to about 44.0 m/min
 f) passing the film over a cooling roller moving at a rate of about 5.3 to about 44.0 m/min, and
 g) winding up the resulting membrane at a rate of about 5.5 to about 47.0 m/min, wherein steps c) to g) are conducted such that a wound-up membrane has an elongation at rupture of about 250 to about 500% in a longitudinal direction and about 200 to about 500% in a transverse direction.

8. The process according to claim 7, wherein the pellets are pressed from a powder comprising polyamide powder produced during the manufacture of polyamide-4,6 and an antioxidant.

9. The process according to claim 7, wherein the pellets are pressed from polyamide-4,6 powder produced during the manufacture of polyamide-4,6 and then coated with an antioxidant.

10. The process according to claim 8, wherein an amount of the antioxidant is about 0.1 to about 1% by weight with respect to the polyamide-4,6.

11. The process according to claim 10, wherein the amount of the antioxidant is about 0.1 to about 0.5% by weight with respect to the polyamide-4,6.

12. The process according to claim 7, wherein the polyamide-4,6 powder is mixed with polyether amide powder and pressed into pellets.

13. The process according to claim 12, wherein an amount of polyether amide is about 5 to about 30% by weight with respect to the polyamide-4,6.

14. The process according to claim 7, wherein the pellets have a length or about 3 to about 7 mm and a width of about 2 to about 4 mm.

15. The process according to claim 7, wherein the extruder is a 3-zone screw extruder.

16. The process according to claim 15, wherein a first extruder zone has a temperature of about 275 to about 285° C., a second extruder zone has a temperature of about 305 to about 315° C., and a third extruder zone has a temperature of about 300 to about 310° C.

17. The process according to claim 7, wherein the slit die has a slit thickness of about 0.5 to about 0.7 mm.

18. The process according to claim 7, wherein the moving surface is a heated casting roller.

19. The process according to claim 18, wherein the casting roller has a temperature of about 110 to about 140° C.

20. The process according to claim 7, wherein the cooling roller has a temperature of about 50 to about 70° C.

21. A membrane produced according to the process of claim 7.

22. Thermally protective clothing comprising the membrane according to claim 1.

23. A laminate comprising the membrane according to claim 1 and a nonwoven material comprising a blend of aramide and polyaramide-based fibers.

24. The process according to claim 9, wherein an amount of the antioxidant is about 0.1 to about 1% by weight, with respect to the polyamide-4,6.

* * * * *

UNITED STATES PATENT AND TRADEMARK OFFICE
CERTIFICATE OF CORRECTION

PATENT NO. : 6,706,413 B2
DATED : March 16, 2004
INVENTOR(S) : Bertram Böhringer et al.

It is certified that error appears in the above-identified patent and that said Letters Patent is hereby corrected as shown below:

Column 5,
Line 17, delete "3zone" and insert -- 3-zone --.
Line 62, delete "corn-p rising" and insert -- comprising --.
Line 64, delete "tat" and insert -- that --.
Line 65, delete "lent" and insert -- least --.

Column 6,
Line 3, delete "kg/b" and insert -- kg/h --.
Line 5, delete "toxin" and insert -- form --.
Line 39, delete "or" and insert -- of --.

Signed and Sealed this

First Day of March, 2005

JON W. DUDAS
*Director of the United States Patent and Trademark Office*